(12) United States Patent
Johnson et al.

(10) Patent No.: US 10,553,117 B1
(45) Date of Patent: Feb. 4, 2020

(54) SYSTEM AND METHOD FOR DETERMINING LANE OCCUPANCY OF SURROUNDING VEHICLES

(71) Applicant: Toyota Motor Engineering & Manufacturing North America, Inc., Plano, TX (US)

(72) Inventors: Miles J. Johnson, Ann Arbor, MI (US); Christopher J. Smalley, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/181,913

(22) Filed: Nov. 6, 2018

(51) Int. Cl.
G08G 1/16 (2006.01)

(52) U.S. Cl.
CPC .............. *G08G 1/167* (2013.01); *G08G 1/166* (2013.01)

(58) Field of Classification Search
CPC combination set(s) only.
See application file for complete search history.

(56) References Cited

U.S. PATENT DOCUMENTS

| | | | |
|---|---|---|---|
| 6,853,906 B1 * | 2/2005 | Michi | B60K 31/0008 701/410 |
| 7,884,740 B2 | 2/2011 | Tzuang et al. | |
| 9,460,624 B2 | 10/2016 | Pandita et al. | |
| 2003/0076415 A1 * | 4/2003 | Strumolo | B60R 1/00 348/149 |
| 2003/0135308 A1 * | 7/2003 | Richardson | G01S 7/411 701/23 |
| 2003/0225519 A1 * | 12/2003 | Miyahara | B60K 31/0008 701/301 |
| 2004/0153217 A1 * | 8/2004 | Mattes | B60K 31/0008 701/1 |
| 2007/0043506 A1 | 2/2007 | Mudalige et al. | |
| 2012/0271540 A1 | 10/2012 | Miksa et al. | |
| 2014/0121880 A1 | 5/2014 | Dolgov et al. | |
| 2015/0217765 A1 * | 8/2015 | Tokoro | B60W 30/09 701/1 |
| 2017/0197627 A1 | 7/2017 | Wieneke et al. | |
| 2017/0232970 A1 | 8/2017 | Schaper et al. | |

* cited by examiner

*Primary Examiner* — Nabil H Syed
*Assistant Examiner* — Cal J Eustaquio
(74) *Attorney, Agent, or Firm* — Christopher G. Darrow; Darrow Mustafa PC

(57) ABSTRACT

System, methods, and other embodiments described herein relate to determining whether lanes in a surrounding environment of an ego vehicle are occupied. In one embodiment, a method includes, in response to detecting a surrounding vehicle from sensor data acquired about the surrounding environment by the ego vehicle, updating a vehicle track for the surrounding vehicle in relation to the ego vehicle. The method includes computing a position probability indicating a probable lateral position of the surrounding vehicle in relation to the ego vehicle as a function of the vehicle track. The method includes generating an occupancy indicator specifying which of the lanes the surrounding vehicle is occupying according to the position probability satisfying an occupancy threshold for a respective one of the lanes.

17 Claims, 6 Drawing Sheets

SYSTEM AND METHOD FOR DETERMINING LANE OCCUPANCY OF SURROUNDING VEHICLES

TECHNICAL FIELD

The subject matter described herein relates, in general, to a system and method for determining whether a travel lane on a road is occupied by a surrounding vehicle, and, more particularly, to leveraging a history of observations of the surrounding vehicle to determine lane occupancy according to a probabilistic approach.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment so that systems such as autonomous driving systems can perceive the noted aspects and accurately plan and navigate accordingly.

In general, the further awareness is developed by the vehicle about a surrounding environment, the better a driver can be supplemented with information to assist in driving and/or the better an autonomous system can control the vehicle to avoid hazards. However, the sensor data acquired by the various sensors generally includes some amount of error. Thus, intrinsically trusting individual identifications of vehicles using a single observation, for example, can result in false detections and misleading information provided to the driver and/or autonomous systems.

In the context of lane identification, observations of a surrounding environment by sensors of the vehicle may be used to identify lanes for lane keeping functions, and other autonomous operations. However, as lane markings vary in quality and type, identifying lanes and correlating lanes with observed vehicles represents a unique difficulty. That is, determining whether a surrounding vehicle is traveling within a particular lane can compound difficulties associated with interpreting sensor data for ensuring accurate detection of a vehicle, determining a precise location of the vehicle, and detection boundaries of lanes, and so on. Thus, identifying which lanes are occupied by surrounding vehicles can represent a significant difficulty. As such, determining the occupancy of lanes surrounding a vehicle in support of autonomous maneuvers such as path planning, lane changing, and so on while useful for the noted purposes represents a task that is compounded by several difficulties.

SUMMARY

In one embodiment, example systems and methods relate to a manner of improving determinations about lane occupancy for lanes surrounding an ego vehicle. The disclosed approach exploits a history of observations (e.g., position history) about surrounding vehicles to produce a probability about whether surrounding lanes of the ego vehicle are occupied by surrounding vehicles. In this way, the disclosed systems and methods avoid the noted difficulties and improve the functioning of the ego vehicle through accurate assessments of lane occupancy.

In one embodiment, a lane occupancy system for determining whether lanes in a surrounding environment of an ego vehicle are occupied is disclosed. The lane occupancy system includes one or more processors and a memory communicably coupled to the one or more processors. The memory stores an acquisition module including instructions that when executed by the one or more processors cause the one or more processors to, in response to detecting a surrounding vehicle from sensor data acquired about the surrounding environment by the ego vehicle, update a vehicle track for the surrounding vehicle in relation to the ego vehicle. The memory further stores an occupancy module including instructions that when executed by the one or more processors cause the one or more processors to compute a position probability indicating a probable lateral position of the surrounding vehicle in relation to the ego vehicle as a function of the vehicle track. The occupancy module further includes instructions to generate an occupancy indicator specifying which of the lanes the surrounding vehicle is occupying according to the position probability satisfying an occupancy threshold for a respective one of the lanes.

In one embodiment, a non-transitory computer-readable medium for determining whether lanes in a surrounding environment of an ego vehicle are occupied and including instructions that when executed by one or more processors cause the one or more processors to perform one or more functions. The instructions include instructions to, in response to detecting a surrounding vehicle from sensor data acquired about the surrounding environment by the ego vehicle, update a vehicle track for the surrounding vehicle in relation to the ego vehicle. The instructions include instructions to compute a position probability indicating a probable lateral position of the surrounding vehicle in relation to the ego vehicle as a function of the vehicle track. The instructions include instructions to generate an occupancy indicator specifying which of the lanes the surrounding vehicle is occupying according to the position probability satisfying an occupancy threshold for a respective one of the lanes.

In one embodiment, a method for determining whether lanes in a surrounding environment of an ego vehicle are occupied is disclosed. In one embodiment, the method includes, in response to detecting a surrounding vehicle from sensor data acquired about the surrounding environment by the ego vehicle, updating a vehicle track for the surrounding vehicle in relation to the ego vehicle. The method includes computing a position probability indicating a probable lateral position of the surrounding vehicle in relation to the ego vehicle as a function of the vehicle track. The method includes generating an occupancy indicator specifying which of the lanes the surrounding vehicle is occupying according to the position probability satisfying an occupancy threshold for a respective one of the lanes.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
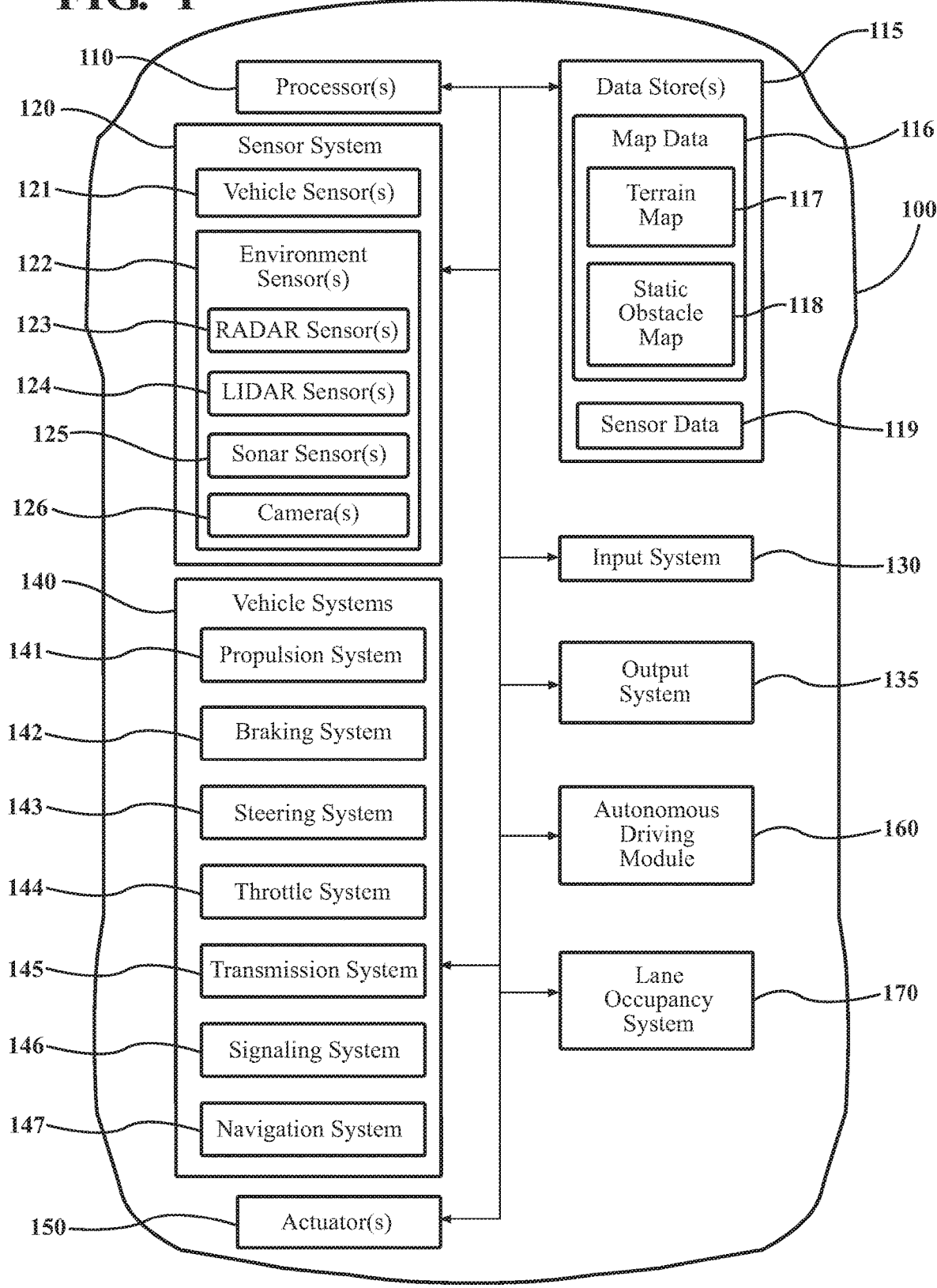
FIG. 1 illustrates one embodiment of a vehicle within which systems and methods disclosed herein may be implemented.

Systems, methods, and other embodiments associated with determining lane occupancy of surrounding vehicles are disclosed. As mentioned previously, a vehicle may include multiple sensors for perceiving aspects of the surrounding environment in order to develop a situational awareness about obstacles, hazards, navigation indicators, road boundaries, and so on. However, in general, difficulties can arise with accurately generating determinations from sensor data due to, for example, intrinsic errors present in the sensor data. That is, difficulties with developing determinations from the sensor data can arise when compounding errors in the sensor data between accurate detection of a vehicle, determining a precise location of the vehicle, detecting lane boundaries, and so on. For example, using instantaneous sensor measurements of surrounding vehicles to identify whether a lane is occupied presents difficulties since road geometry may be unknown, and, thus, whether an instantaneous location of the detected vehicle correlates with a lane may also be unknown or difficult to determine when road geometry is not known. Thus, using instantaneous sensor measurements may lead to inaccurate determinations of lane occupancy, Therefore, in one embodiment, a lane occupancy system and associated methods as disclosed herein provide for using a probabilistic approach for lane occupancy determinations that leverage a history of observations. To achieve this determination, the ego vehicle, in one approach, fuses sensor data from multiple different sensors. The ego vehicle can then analyze the resulting sensor data to identify the presence of surrounding vehicles in lanes about the ego vehicle. Accordingly, measurements of relative positions from the ego vehicle to the identified surrounding vehicles can then be derived from the sensor data to provide information about where the surrounding vehicles are located relative to the ego vehicle. In various embodiments, the precise manner in which the measurement is determined can vary according to, for example, a position of the surrounding vehicle (e.g., frontward, adjacent, rearward), available sensor data, and so on. However, it should be appreciated that the measurement generally provides a depiction of the relative location/ position (and variance) of the surrounding vehicle in order to characterize a likely lane position of the surrounding vehicles.

In one aspect, the ego vehicle collects the observations of the surrounding vehicles to establish a history of measurements (i.e., position history) from which relative tracks for the surrounding vehicles are derived. The ego vehicle, in one approach, generates vehicle tracks from the history of measurements according to a spline interpolation or other approximation derived from the history. In either case, the ego vehicle uses the relative tracks to derive probabilities of lateral offsets from the ego vehicle, and, in one embodiment, to infer the presence of lanes. The ego vehicle can then interpret the lateral offset probabilities in relation to perceived lane boundaries to generate predictions about whether the lanes are occupied by the surrounding vehicles. In one approach, the ego vehicle provides explicit determinations of likely regions surrounding the ego vehicle that are occupied by the surrounding vehicles. Alternatively, the ego vehicle can provide a coarse representation of lane occupancy that indicates whether a lane is likely occupied or not. In either case, the ego vehicle improves determinations about lane occupancy through the present approach and thereby further improves the certainty with which a driver is informed about the presence of vehicles, operation of autonomous driving functions in relation to path planning, obstacle avoidance, lane changes, and so on.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein to derive relative lane occupancies for other entities travel in relation to the vehicle 100. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

Additionally, the disclosure further discusses the vehicle 100 as traveling on a roadway that includes multiple lanes. However, the present approach to determining lane occupancy may be applied to multi-lane roadways (e.g., 2, 3, 4 or more lanes traveling in a single direction) and also off-road tracks having widths to accommodate multiple vehicles, unmarked driving terrain (e.g., salt flats), and so on. In general, the approach provided herein for determining lane occupancy is characterized by a relative positioning of vehicles in relation to the ego vehicle 100 and, thus, is applicable in circumstances beyond a traditional multi-lane highway. Moreover, the vehicle 100 is generally referred to herein as the ego vehicle 100 since the disclosed approach is discussed from the perspective of the vehicle 100 developing awareness of the surrounding environment through acquired sensor data.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1.

In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a lane occupancy system 170 that is implemented to perform methods and other functions as disclosed herein relating to calibrating multiple sensors together such as LiDAR sensors and cameras. The noted functions and methods will become more apparent with a further discussion of the figures.

Figure 2:
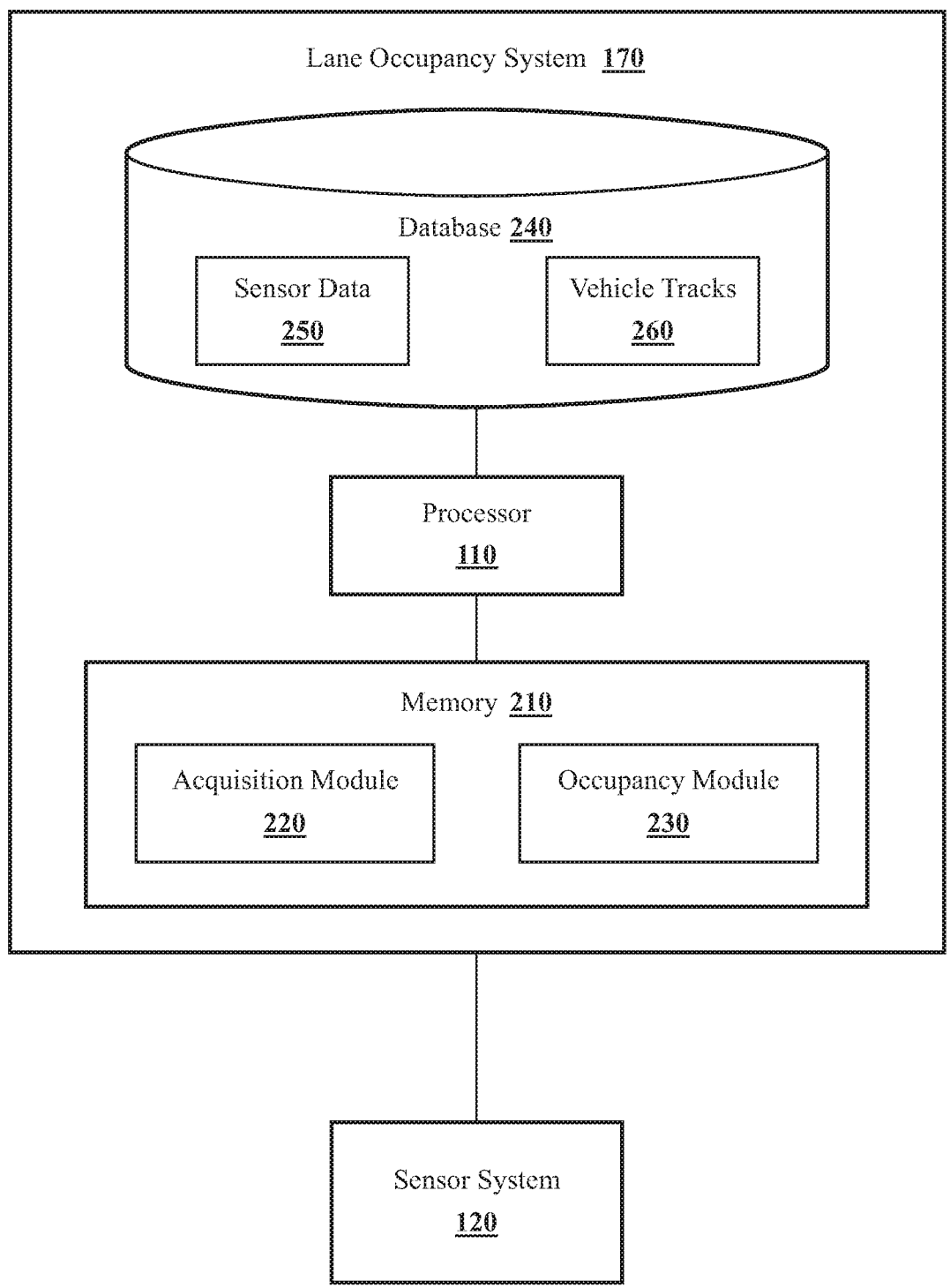
FIG. 2 illustrates one embodiment of a lane occupancy system that is associated with determining whether lanes around an ego vehicle are presently occupied.

With reference to FIG. 2, one embodiment of the lane occupancy system 170 of FIG. 1 is further illustrated. The lane occupancy system 170 is shown as including a processor 110 from the vehicle 100 of FIG. 1. Accordingly, the processor 110 may be a part of the lane occupancy system 170, the lane occupancy system 170 may include a separate processor from the processor 110 of the vehicle 100 or the lane occupancy system 170 may access the processor 110 through a data bus or another communication path. In one embodiment, the lane occupancy system 170 includes a memory 210 that stores an acquisition module 220 and an occupancy module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the acquisition module 220 generally includes instructions that function to control the processor 110 to receive data inputs from one or more sensors of the vehicle 100 that form sensor data 250, which embodies observations of the surrounding environment of the vehicle 100 including at least surrounding lanes and any vehicles that may be present in the lanes. The present discussion will focus on acquiring the sensor data 250 using multiple sensors of the vehicle 100 including, for example, radar 123 and camera 126. However, it should be appreciated that the disclosed approach can be extended to cover further configurations of sensors such as LiDAR sensors with one or more cameras, different types of LiDARs and cameras, combinations of radars and cameras, sonar, use of a single sensor (e.g., camera), sensors of the surrounding vehicles leveraged via vehicle-to-vehicle communications (v2v), and so on.

Accordingly, the acquisition module 220, in one embodiment, controls the respective sensors to provide the data inputs in the form of the sensor data 250. Additionally, while the acquisition module 220 is discussed as controlling the various sensors to provide the sensor data 250, in one or more embodiments, the acquisition module 220 can employ other techniques to acquire the sensor data 250 that are either active or passive. For example, the acquisition module 220 may passively sniff the sensor data 250 from a stream of electronic information provided by the various sensors to further components within the vehicle 100. Moreover, as previously indicated, the acquisition module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of measurements acquired from multiple sensors.

The sensor data 250 itself generally provides relative measurements between the ego vehicle 100 and the surrounding vehicles that in combination improve the quality (e.g., reduce variance) in the measurements overall. The sensor data 250 may also include information other than the measurements that is used, for example, to identify the surrounding vehicles, identify lane markings, and so on. Moreover, the acquisition module 220, in one embodiment, controls the sensors to acquire the sensor data 250 about an area that encompasses 360 degrees about the vehicle 100 in order to provide a comprehensive assessment of the surrounding environment. Of course, in alternative embodiments, the acquisition module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Furthermore, in one embodiment, the lane occupancy system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes sensor data 250 along with, for example, other information that is used by the modules 220 and 230 such as vehicle tracks 260. Of course, in further embodiments, the vehicle tracks 260 are stored within the memory 210 or another suitable location as may be individually implemented according to the acquisition module 220.

As a further explanation of the sensor data 250 that is leveraged by the occupancy module 230 to produce the noted determinations, the sensor data 250 can include 3D point cloud data, camera images and/or video from the camera 126, radar measurements, and so on. In further embodiments, the sensor data 250 includes information from further sensors (e.g., an IMU) that may be used to perform various tasks (e.g., motion blur correction) in support of the processes noted herein.

The acquisition module 220, in one embodiment, is further configured to perform additional tasks beyond controlling the respective sensors to acquire and provide the sensor data 250. For example, the acquisition module 220 initially analyzes the sensor data 250 to distinguish surrounding vehicles from the surrounding environment (e.g., background, roadway, etc.). In various approaches, the acquisition module 220 employs different object recognition techniques to identify the surrounding vehicles. The particular technique employed to identify the surrounding vehicles may depend on available sensors within the vehicle 100, computational abilities (e.g., processor power) of the vehicle 100, and so on.

In one approach, the acquisition module 220 uses a machine learning algorithm embedded within the acquisition module 220, such as a convolutional neural network (CNN), to perform semantic segmentation over the sensor data 250 from which the surrounding vehicles are identified and extracted. Of course, in further aspects, the acquisition module 220 may employ different machine learning algorithms or implements different approaches for performing the semantic segmentation which can include deep convolutional encoder-decoder architectures, a multi-scale context aggregation approach using dilated convolutions, or another suitable approach that generates semantic labels for the separate object classes represented in the image. Whichever particular approach the acquisition module 220 implements, the acquisition module 220 provides an output with semantic labels identifying objects represented in the sensor data 250. In this way, the lane occupancy system 170 distinguishes between objects and boundaries between the objects.

Whichever approach is undertaken, the acquisition module 220 is generally capable of identifying the surrounding vehicles in order to acquire measurements about relative positions of the surrounding vehicles from the sensor data 250. Thus, by way of example, the acquisition module 220, in one approach, initially acquires the sensor data 250, fuses the sensor data 250 from multiple sensors (i.e., registers and combines information), identifies the surrounding vehicles within the sensor data 250, and then determines measurements to relative positions associated with the surrounding vehicles. The acquisition module 220 determines the measurements by, for example, analyzing the sensor data 250 for each of the surrounding vehicles relative to a center position of the ego vehicle 100. That is, in one approach, the acquisition module 220 measures from a centroid of the vehicle 100 to the surrounding vehicle. Alternatively, the acquisition module 220 measures form a center point of a lane in which the ego vehicle 100 is traveling, a forward edge center point of the ego vehicle 100, a location of a controlling sensor, or another defined point of the ego vehicle 100. In either case, the acquisition module 220 functions to translate the points together into a single reference point or generally use a single one of the noted points in order to maintain consistency between measurements.

A point on a surrounding vehicle that is being measured to by the ego vehicle 100 can vary according to a particular implementation. In one approach, the acquisition module 220 measures to a centroid of a respective surrounding vehicle, which may be derived/assessed according to the identification of the surrounding vehicle. Alternatively, the acquisition module 220 may identify a closest point on the surrounding vehicle and determine a relative lateral center point related thereto to define a measurement point of the surrounding vehicle. In this way, the acquisition module 220 can adjust to varying detection positions (e.g., forward, adjacent, aft) of surrounding vehicles to provide a consistent measurement.

Additionally, in further aspects, the acquisition module 220 also processes the sensor data 250 to identify lanes within a roadway on which the ego vehicle 100 is traveling. For example, the acquisition module 220 may use similar techniques as employed to identify the surrounding vehicles. In further aspects, the acquisition module 220 uses high definition maps of a location to identify lane boundaries. In still further aspects, the acquisition module 220 uses a combination of maps and image recognition via onboard cameras to determine lane boundaries relative to the vehicle. The acquisition module 220, in one embodiment, uses existing lane identification functionality as may be provided for by integrated lane-keeping functions or autonomous driving functions to determine lane boundaries. In either case, the acquisition module 220 generally functions to identify the lane boundaries relative to the vehicle 100 so that occupancy module 230 can subsequently compare determinations about the lateral positions of the surrounding vehicles and determine lane occupancies.

Furthermore, as previously indicated, the acquisition module 220 provides, in one embodiment, the measurements from the sensor data 250 for the identified surrounding vehicles. The measurements are, in one embodiment, quantities of distance and direction relative to the measurement point of the ego vehicle 100. Thus, the measurements can be in the form of distance and direction, line quantities (e.g., two endpoints on a 2D plane, etc.), or in another suitable form. In one approach, the measurements are provided in a data structure that maintains a history of measurements associated with a unique surrounding vehicle. Thus, the acquisition module 220 provides an individual measurement as, for example, a struct that stores a timestamp of the measurement, a unique identifier of the surrounding vehicle associated with the measurement, position, and position variance. The precise form of the position can vary according to implementation. In general, the position is provided as a relative 2D position in a plane of the roadway relative to the measurement point of the ego vehicle 100 as previously described. Alternatively, the acquisition module 220 may generate the position as a 3D point relative to the ego vehicle 100 that accounts for changes in elevation.

In either case, the acquisition module 220 stores the measurements in a data structure together as a history of positions for each surrounding vehicle. The acquisition module 220 may track the surrounding vehicles in the history of measurements over a relative distance window from the ego vehicle 100. That is, for example, the acquisition module 220 can initially acquire a surrounding vehicle at a distance of 100 meters in front or behind the ego vehicle 100 and generally traveling in a same direction as the ego vehicle 100. Thus, when the surrounding vehicle lapses from this tracking window, the measurements for the surrounding vehicle may be removed from the history, logged, or otherwise no longer considered in the context of lane occupancy determinations. It should be appreciated that while a tracking window of +/−100 m is noted, the particular tracking window implemented by the lane occupancy system may vary according to sensor fidelity, and/or other controlling factors.

As a further matter, in one or more aspects of the present arrangement, the acquisition module 220 upon acquiring a new measurement, initially updates prior measurements according to movements (e.g., from speed and yaw rate over period since previous measurement) of the ego vehicle 100 in order to maintain the history of measurements in a relative frame of reference centered on the ego vehicle 100. Thus, the acquisition module 220 determines a relative position from a newly acquired measurement of a surrounding vehicle and then adds the new relative position while also updating the prior measurements according to movements of the ego vehicle 100. In this way, the acquisition module 220 maintains the history of measurements relative to a present position of the ego vehicle 100.

Moreover, the acquisition module 220, in one aspect, further computes the vehicle tracks 260 from the history of measurements. That is, in one approach, the acquisition module 220 computes an estimate of a vehicle track/path for each of the surrounding vehicles relative to the ego vehicle 100. In one embodiment, the acquisition module 220 interpolates the vehicle tracks 260 according to relative positions and variances recorded in the history of measurements (e.g., position history) for each of the surrounding vehicles. The vehicle tracks 260 provide an approximation of actual travel paths for the surrounding vehicles in relation to the ego vehicle 100 and over a history of observations. Thus, in one aspect, the vehicle tracks 260 provide for improved sampling and determinations of lane occupancy as discussed subsequently. Additionally, the acquisition module 220 updates the vehicle tracks 260 for each subsequent measurement to provide an update to date approximation of the path of the surrounding vehicles.

Figure 5:
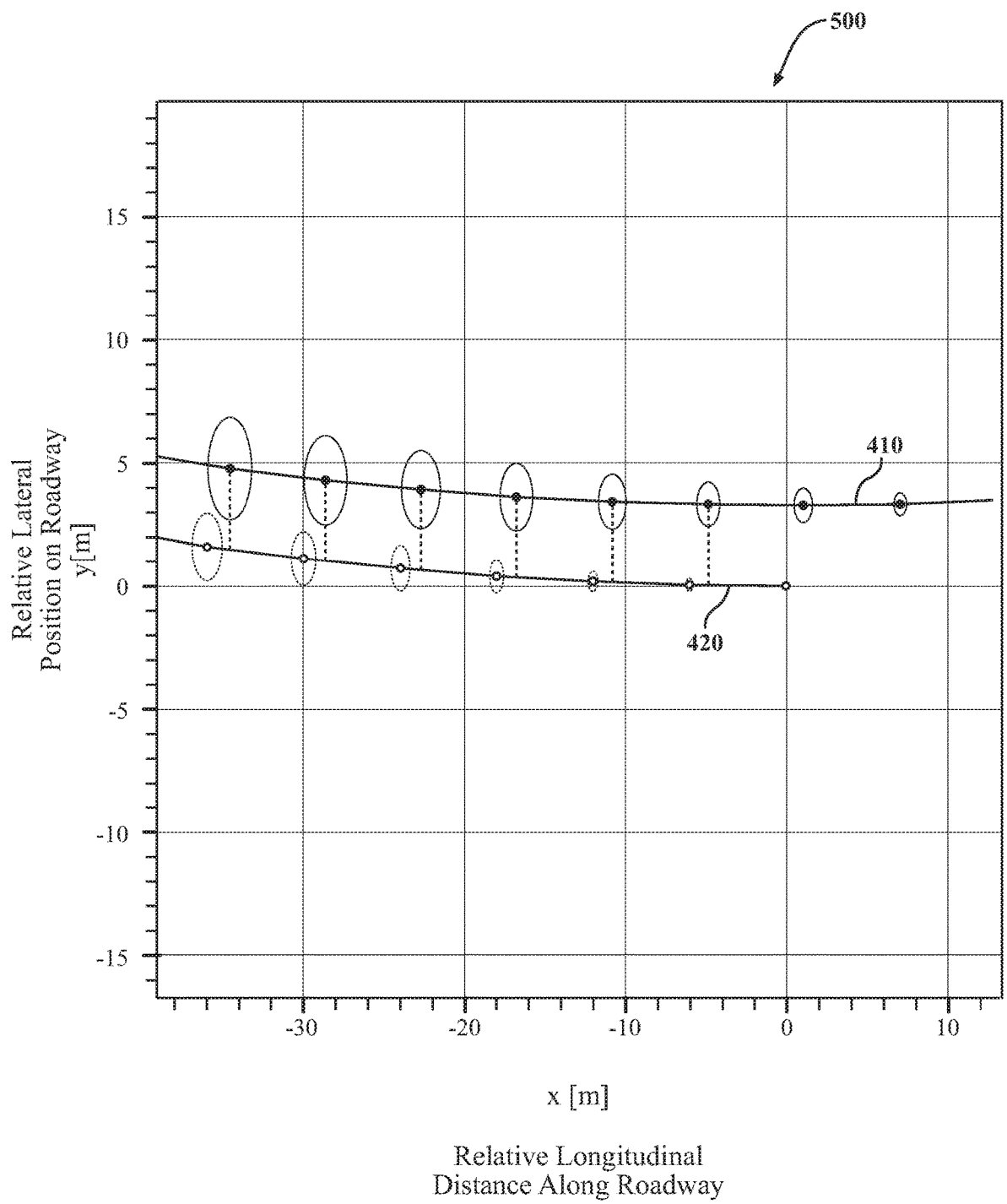
FIG. 5 illustrates vehicle tracks for an ego vehicle and one surrounding vehicle including lateral offsets between the ego vehicle and the surrounding vehicle.

The occupancy module 230 uses the information from the acquisition module 220 to determine occupancies for surrounding lanes of the ego vehicle 100. For example, the occupancy module 230 computes lateral offsets in relation to the ego vehicle 100 as shown in FIG. 5, which is described in greater detail subsequently. The occupancy module 230 computes the lateral offsets as probability distributions by using the vehicle tracks 260 corresponding to the separate surrounding vehicles. As a result, historical measurements/positions from the vehicle tracks 260 are characterized in the form of a lateral offset probability from a known track/path of the ego vehicle 100. It should be appreciated that the lateral offset probabilities are probabilistic distributions including variances for various samples along the vehicle tracks 260 in relation a track of the ego vehicle 100. Thus, at each separate longitudinal distance along the track an offset between, for example, a track 410 of a surrounding vehicle and a track 420 of the ego vehicle 100 is described as a probabilistic distribution (e.g., Gaussian distribution—a mean and a variance). This is represented in FIG. 5 according to ellipses about each track as identified by the vertical lines in relation to the ego vehicle track 420.

The occupancy module 230, in one embodiment, computes a discrete probability over the lateral offset distributions to discretize the lateral offsets into a single value that represents a likely lateral position (e.g., mean) for a particular surrounding vehicle. The occupancy module 230 can then compute the position probability using the discrete probability in relation to partitions of the lanes identified by the ego vehicle 100. That is, the occupancy module 230 uses the separate lateral offset distributions derived from sampling one of the vehicle tracks 260 to compute an overall discrete probability distribution for the particular surrounding vehicle in relation to lane boundaries and relative to the ego vehicle 100. Thus, the position probability indicates, in one embodiment, a discrete likelihood of the particular surrounding vehicle existing in a given one of the surrounding lanes at the present time step.

Of course, the position probability can exist within a range of possible values that may vary between a high correlation with a particular lane to a marginal correlation or no correlation. These various circumstances may arise according to variations in how well the surrounding vehicle is maintaining/tracking within a lane. Variations may also occur when the surrounding vehicle switches between lanes, which may cause the position probability to, for example, temporarily fall outside of a precise lane boundary.

The acquisition module 220 generally indicates the lane boundaries relative to the ego vehicle 100. Thus, the acquisition module 220 may provide the lane boundaries as relative measurements centered about the ego vehicle 100 as illustrated with FIGS. 4-5. Accordingly, the occupancy module 230, in one embodiment, compares the discrete probability with the separate lane boundaries to generate the position probability. The resulting position probability is relative to each lane and thus the occupancy module 230, in one approach, determines whether the position probability satisfies an occupancy threshold for the surrounding vehicle to occupy a given one of the lanes.

For example, in one approach, the occupancy module 230 defines the occupancy threshold according to a degree of certainty for asserting a lane as being occupied. As such, the occupancy threshold may be defined according to a level of certainty for which the ego vehicle 100 is assured the surrounding vehicle is located in a given lane. Thus, the occupancy module 230 compares the position probability with the occupancy threshold, and if the position probability satisfies (e.g., exceeds, is greater than, etc.) the occupancy threshold, then the occupancy module 230 generates an indication specifying the associated lane as being occupied.

In various circumstances, the occupancy module 230 can generate the indication according to varying degrees of granularity. That is, the occupancy module 230 generates the position probability according to a grid of regions about the ego vehicle 100 (e.g., forward, adjacent, rear) and also in relation to the existing lane boundaries. Moreover, in a circumstance where the position probability does not satisfy an occupancy threshold for any of the surrounding lanes but the position probability is close to the occupancy threshold of a lane (e.g., within 5%), the occupancy module 230, in one embodiment, provides a secondary indication of a likely location but does not assert the lane occupancy indicator. Moreover, in further approaches, the occupancy module 230 correlates the position probability against further location identifying information (e.g., V2V communications, localization information, etc.) when the occupancy threshold of a lane is not satisfied to provide the secondary indicator. In this way, the occupancy module 230 can provide a precise indication about which lanes are occupied and which regions of those lanes are occupied and/or alternatively provide a fallback indication about a likely location when the occupancy threshold is not satisfied.

In either case, the occupancy module 230 can generate the occupancy indicator as an alert or other indication to a driver about the presence of the surrounding vehicle in a particular lane/region of a lane. In further aspects, the occupancy module 230 generates the occupancy indicator as an indication to advanced driving assistance systems (ADAS) of the vehicle 100, autonomous driving systems/modules of the vehicle 100, to other surrounding vehicles via V2V communications, and so on. In general, the occupancy module 230 generates the occupancy indicator to improve the situational awareness of the vehicle 100 and/or other vehicles and thereby improve driving safety and control of the vehicle 100. In this way, the lane occupancy system 170 improves the overall functioning of the vehicle 100 through adding additional information to the situational awareness of the driver and/or driving systems.

Figure 3:
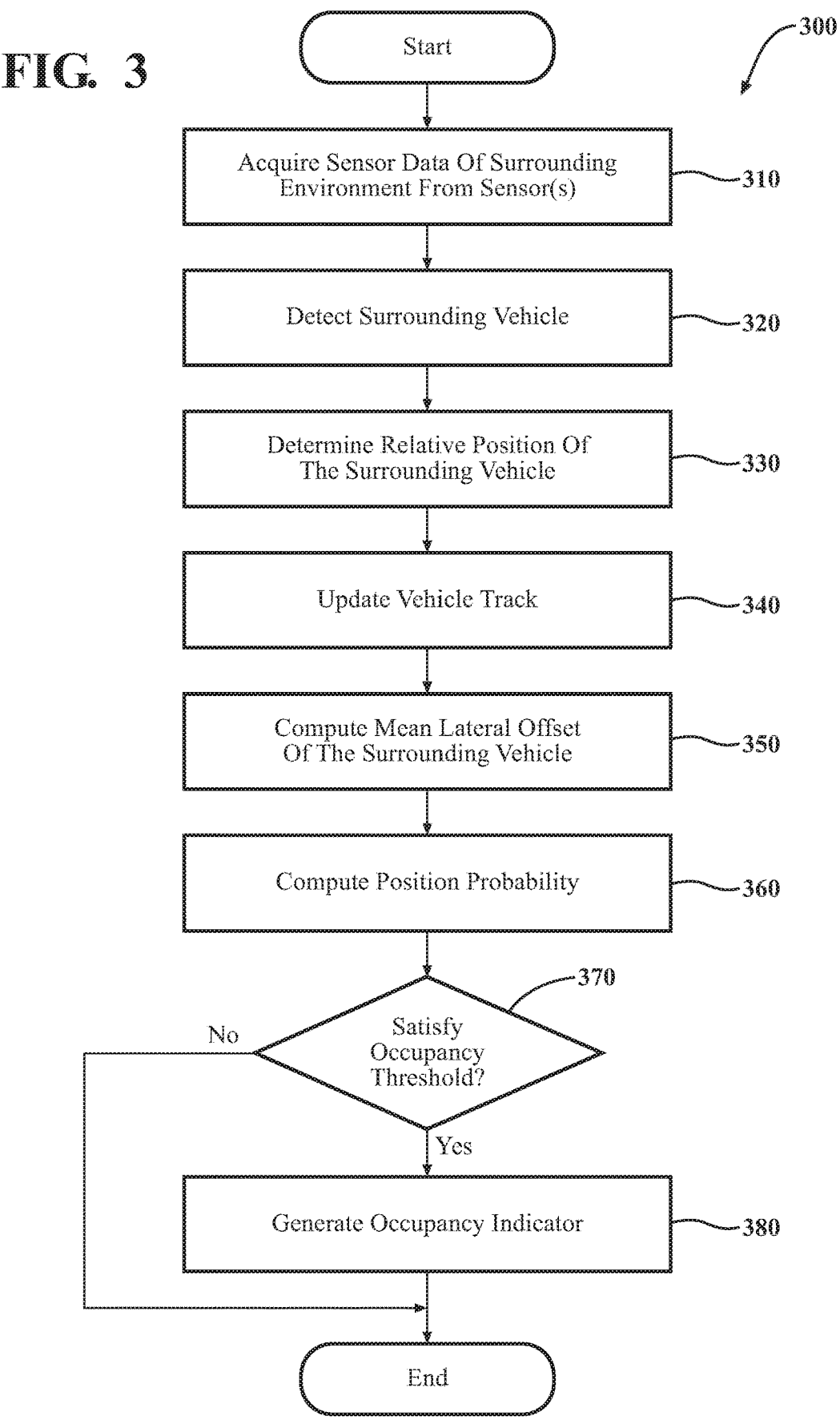
FIG. 3 illustrates one embodiment of a method associated with using a history of observations for surrounding vehicles to determine lane occupancy.

Additional aspects of determining lane occupancy using a history of measurements will be discussed in relation to FIG. 3. FIG. 3 illustrates a flowchart of a method 300 that is associated with using relative positions of surrounding vehicles to produce determinations about lane occupancy. Method 300 will be discussed from the perspective of the lane occupancy system 170 of FIGS. 1, and 2. While method 300 is discussed in combination with the lane occupancy system 170, it should be appreciated that the method 300 is not limited to being implemented within the lane occupancy system 170 but is instead one example of a system that may implement the method 300.

At 310, the acquisition module 220 controls the sensor system 120 to acquire the sensor data 250. In one embodiment, the acquisition module 220 controls the LiDAR sensor 124 and the camera 126 of the vehicle 100 to observe the surrounding environment. Alternatively, or additionally, the acquisition module 220 controls the camera 126 and the radar 123 or another set of sensors to acquire the sensor data 250. As part of controlling the sensors to acquire the sensor data 250, it is generally understood that the sensors acquire the sensor data 250 of a region around the ego vehicle 100 with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the acquisition module 220, in one embodiment, controls the sensors to acquire the sensor data 250 of the surrounding environment.

Moreover, in further embodiments, the acquisition module 220 controls the sensors to acquire the sensor data 250 at successive iterations or time steps. Thus, the lane occupancy system 170, in one embodiment, iteratively executes the functions discussed at blocks 310-380 to acquire the sensor data 250 and provide information therefrom. Furthermore, the acquisition module 220, in one embodiment, executes one or more of the noted functions in parallel for separate observations in order to maintain updated perceptions. Additionally, as previously noted, the acquisition module 220, when acquiring data from multiple sensors, fuses the data together to form the sensor data 250 and to provide for improved determinations of detection, location, and so on.

At 320, the acquisition module 220 detects surrounding vehicles traveling on the roadway with the ego vehicle 100. In one embodiment, the acquisition module 220 applies, as previously noted, semantic segmentation or another object recognition routine to the sensor data 250 in order to detect/identify the surrounding vehicle(s). Additionally, while the acquisition module 220 is generally discussed as identifying a single surrounding vehicle in relation to method 300, it should be appreciated that the systems and methods disclosed herein perform the noted tasks in parallel for a number n of surrounding vehicles that are detected, where n is an integer value greater than zero.

Of course, the acquisition module 220 may also identify further features in addition to the surrounding vehicles such as the sky, roads, buildings, lane markings, curbs, sidewalks, signs, posts, trees, and so on. In this way, the lane occupancy system 170 delineates between aspects of the surrounding environment to extract the surrounding vehicles. Moreover, the acquisition module 220, in one approach, further employs one or more additional sources such as other vehicles, infrastructure sensors, high-definition maps, and so on to delineate different aspects (e.g., lane markings) of the surrounding environment.

At 330, the acquisition module 220 determines a relative position of the surrounding vehicle detected at 320 in relation to the ego vehicle 100. In one embodiment, as previously discussed, the relative position is determined from a center point of the lane in which the ego vehicle is traveling and from a longitudinal location in the lane of the ego vehicle 100. In further aspects, the relative position is determined from a centroid of the ego vehicle 100 or another suitable location. In any case, the acquisition module 220 generally determines the relative position as a measurement to a lateral geometric center of the surrounding vehicle. Thus, the relative position is generally defined according to a position in a two-dimensional coordinate system with the ego vehicle 100 located at a center thereof.

Figure 4:
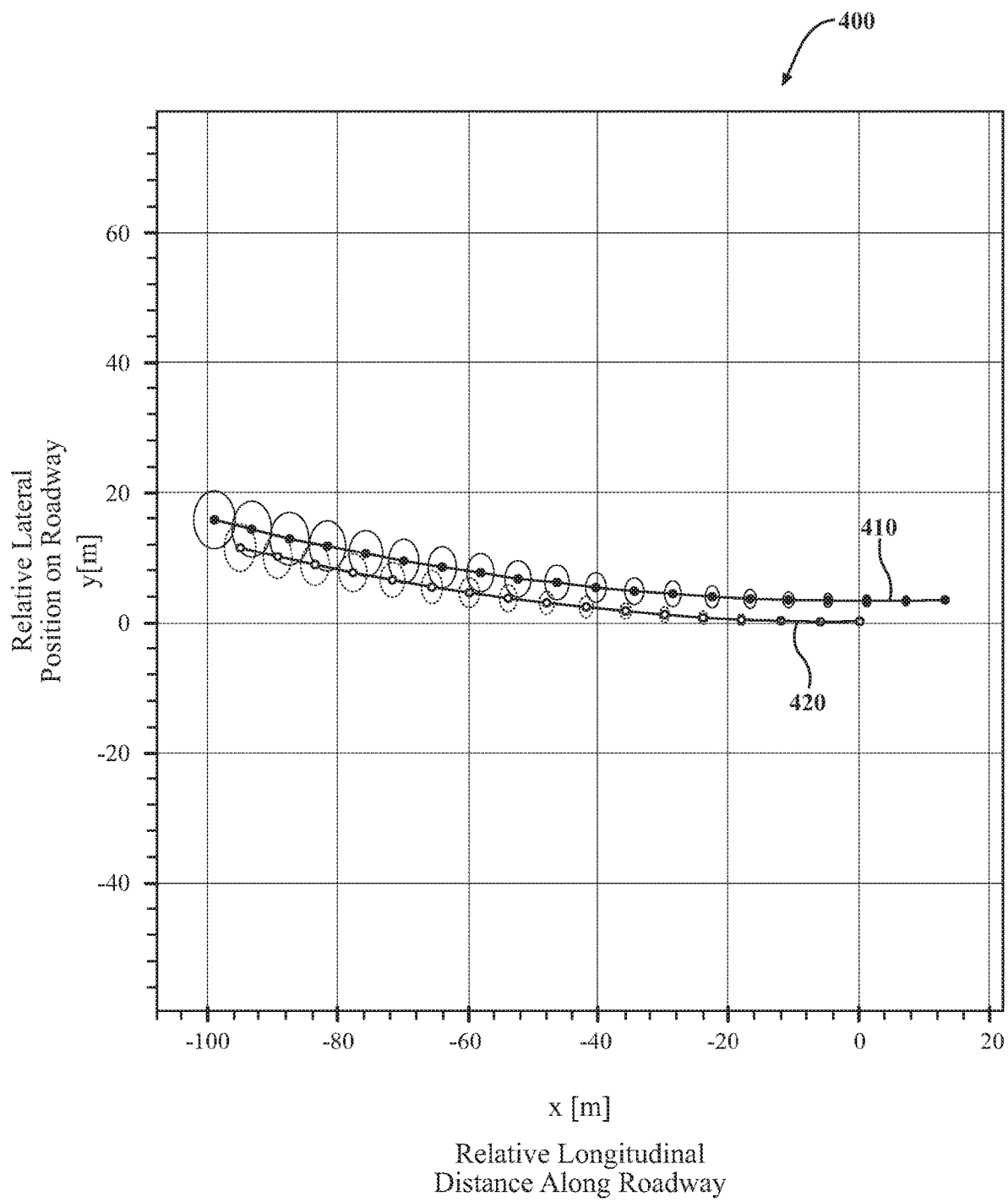
FIG. 4 illustrates a history of measurements of one surrounding vehicle in relation to the ego vehicle.

By way of example, FIG. 4 illustrates a grid 400 displaying a history of measurements for a surrounding vehicle and the ego vehicle 100 that have been updated (e.g., according to the motion of the ego vehicle 100) for a current time step. The grid 400 illustrates a plot 410 for the surrounding vehicle in relation to a plot 420 for the ego vehicle 100. Because the grid is oriented relative to the ego vehicle 100 at the current time step, the location of the ego vehicle 100 is at the center of the coordinate frame (e.g., at 0, 0). The points along the lines illustrate separate measurements while the line (i.e., vehicle track) is interpolated therefrom for the surrounding vehicle. The ellipses about the points generally illustrate probability distributions for the past measurements according to accumulated variances as the measurements are updated at successive time steps.

At 340, the acquisition module 220 updates a vehicle track for the surrounding vehicle in relation to the ego vehicle 100. In one embodiment, the acquisition module 220 appends the measurement to a measurement history of previous measurements of the surrounding vehicle and adjusts the previous measurements according to the motion of the ego vehicle since a previous update. The acquisition module 220 associates a unique identifier with the surrounding vehicle that facilitates tracking the surrounding vehicle between measurements. Thus, as indicated, the history of measurements for the surrounding vehicle is updated according to the motion of the ego vehicle 100 to maintain the relative coordinates. The acquisition module 220 can then generate an updated vehicle track from the updated history. The vehicle track is a parameterization of the measurement history that defines an estimated path of the surrounding vehicle. Thus, the acquisition module 220, in one approach, interpolates the vehicle track according to a spline interpolation or another suitable approach. In this way, the general path of the surrounding vehicle relative to the ego vehicle is defined.

At 350, the occupancy module 230 determines a discrete probability that represents a mean lateral offset for the surrounding vehicle over the vehicle track and according to partitions of the lanes identified by the ego vehicle 100. That is, the occupancy module 230 determines lateral offsets from, for example, a track of the ego vehicle 100. In general, the occupancy module 230 computes the lateral offsets as probability distributions according to a Gaussian distribution. The lateral offsets are determined between the vehicle tracks (e.g., 410 and 420). As shown in FIG. 5, the vertical lines between the plots 410 and 420 represent the lateral offsets, which are provided as discrete probability distributions for locations of the surrounding vehicle in relation to the ego vehicle 100. As a further note, the paths 410 and 420 generally follow lanes of a roadway on which the vehicles are traveling. Thus, the lateral offsets over time should generally correlate with the known lane boundaries when the vehicles track lanes.

Accordingly, the occupancy module 230 uses the lateral offsets over the vehicle track to compute the discrete probability of mean lateral position for the surrounding vehicle. In one embodiment, the occupancy module 230 uses a form of inverse variance weighting to combine the separate lateral offset distributions into a single discrete probability. In further embodiments, the occupancy module 230 implements a modified form of Bayesian inference, Kalman filtering, or another suitable approach to generate the discrete probability from the lateral offset distributions for the surrounding vehicle. In either case, the resulting discrete probability represents a mean lateral offset that is a single discrete value for a likely relative position of the surrounding vehicle.

At 360, the occupancy module 230 computes a position probability indicating a probable lateral position of the surrounding vehicle. That is, the occupancy module 230 uses the discrete probability discussed at block 350 in combination with the lane boundaries for the roadway on which the vehicles are traveling to determine a likely lane of travel. Thus, the position probability indicates a probability with respect to each lane that the surrounding vehicle is positioned in the respective lane. Accordingly, the occupancy module 230 determines the position probability in comparison with the known lane boundaries for the surrounding lanes. In general, the position probability is provided for a prevailing lane (i.e., a lane for which the surrounding vehicle has a highest probability of being located).

At 370, the occupancy module 230 compares the position probability with the occupancy threshold to determine whether the position probability indicates to an acceptable degree that the surrounding vehicle is occupying an associated one of the surrounding lanes. As previously noted, the occupancy module 230 compares the position probability with the occupancy threshold in order to ascertain whether the previous determination indicated with sufficient certainty that the surrounding vehicle is actually located in a corresponding lane. It should be noted, that depending on a particular implementation the occupancy threshold may be varied. That is, in circumstances where, for example, sensor data is more precise, the driving environment is more simple (e.g., straightaway on a highway with consistent speeds and no traffic), and so on, then the occupancy threshold may be dynamically lowered according to the present circumstances.

In either case, if the position probability does not satisfy the occupancy threshold (e.g., is less than), then the occupancy module 230 does not generate the occupancy indicator at 380. Instead, in one embodiment, the occupancy module 230 undertakes a separate determination as a fallback. Such a fallback mechanism was previously discussed in relation to the lane occupancy system 170 and thus will not be revisited. However, it should be appreciated that indications provided by the system can span a spectrum as may be inferred from separate position probabilities relating to the different lanes for the surrounding vehicle (e.g., change lanes, swerving between lanes, and so on). As such, the occupancy module 230 may undertake such a further analysis of patterns between position probabilities when a position probability for a single lane does not satisfy the occupancy threshold. Alternatively, the occupancy module 230 may provide no indication, and other systems of the ego vehicle 100 may instead control any determinations about possible vehicles, obstacles, etc.

At 380, the occupancy module 230 generates an occupancy indicator specifying which of the lanes the surrounding vehicle is occupying. In one embodiment, the occupancy module 230 indicates a particular lane that is occupied. Alternatively, or additionally, the occupancy module 230 indicates a lane and also a region of the lane (e.g., forward, adjacent, aft). In either case, the occupancy module 230 improves the situational awareness of the surrounding environment by indicating the lane occupancy and thereby improves an ability of additional systems in the vehicle to make determinations about changing lanes, avoiding hazards/obstacles, and so on.

Figure 6:
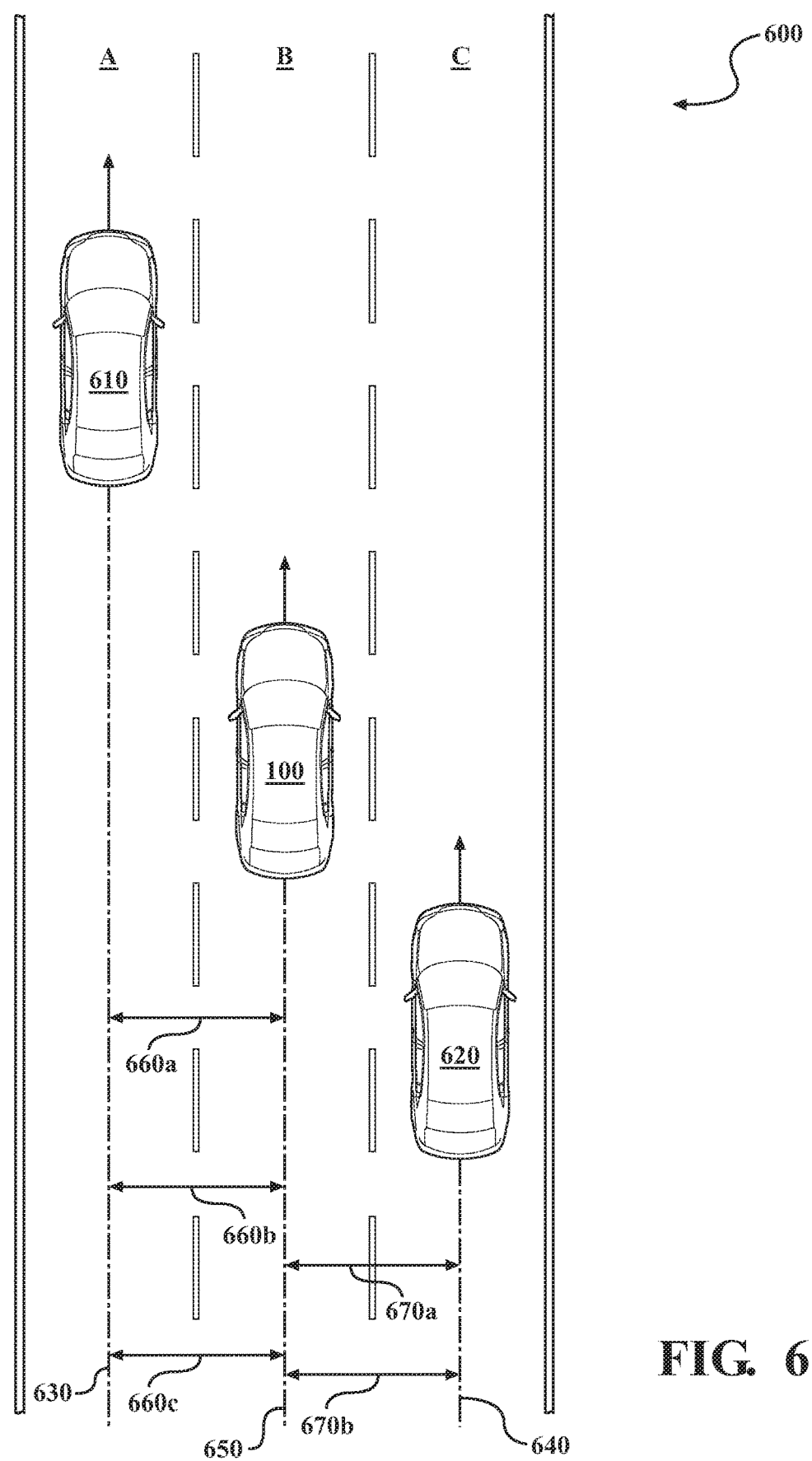
FIG. 6 illustrates an example configuration of vehicles on a highway that includes three lanes.

As a further explanation of how the lane occupancy system 170 improves the functioning of the ego vehicle 100, consider FIG. 6. FIG. 6 illustrates an example configuration of vehicles on a highway 600. The highway 600 includes lanes A, B, and C, which provide for traffic flow in a single direction. The ego vehicle 100 is positioned in lane B. As illustrated, the highway 600 further includes a surrounding vehicle 610 in lane A and a surrounding vehicle 620 in lane C. For purposes of this discussion assume that the ego vehicle 100 has acquired a history of measurements/positions for the vehicles 610 and 620.

Accordingly, at a current time step, the lane occupancy system 170 detects the vehicles 610 and 620 using sensor data 250 collected from sensors of the vehicle 100. The lane occupancy system 170 then proceeds to update the vehicle tracks 630 and 640 for the respective vehicles 610 and 620 according to the sensor data 250 and motion of the vehicle 100 as embodied in vehicle track 650 of the ego vehicle 100. The lane occupancy system 170 then generates the lateral offset distributions 660a, 660b, 660c, ... 660n, and 670a, 670b, ... 670n for the respective vehicles 610 and 620 between the tracks 630/640 and 650.

The lane occupancy system 170 combines the respective separate distributions into a discrete probability of lateral position for each respective surrounding vehicle 610 and 620 according to the noted approaches to combing normal distributions into a single discrete distribution. The discrete probability for each surrounding vehicle 610 and 620 is then compared with the lane boundaries for lane A, lane B, and lane C as determined by the ego vehicle 100 from the sensor data 250 and/or further sources (e.g., maps). As such, the lane occupancy system 170 generates a position probability for the vehicle 610 and the vehicle 620. In the illustrated example of FIG. 6, the lane occupancy system 170 generates occupancy indicators for both lanes A and B since the position probabilities satisfy a threshold for the respective lanes. In this way, the lane occupancy system 170 derives lane occupancies from a history of measurements using a probailistic approach to improve how systems in the vehicle 100 are informed while also overcoming aberrations in generating single observation determinations from the sensor data 250.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the lane occupancy system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the lane occupancy system 170, and/or the autonomous driving module(s) 160 may control some or all of these vehicle systems 140 and, thus, may be partially or fully autonomous.

The processor(s) 110, the lane occupancy system 170, and/or the autonomous driving module(s) 160 can be operatively connected to communicate with the various vehicle systems 140 and/or individual components thereof. For example, returning to FIG. 1, the processor(s) 110, the lane occupancy system 170, and/or the autonomous driving module(s) 160 can be in communication to send and/or receive information from the various vehicle systems 140 to control the movement, speed, maneuvering, heading, direction, etc. of the vehicle 100. The processor(s) 110, the lane occupancy system 170, and/or the autonomous driving module(s) 160 may control some or all of these vehicle systems 140.

The processor(s) 110, the lane occupancy system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the lane occupancy system 170, and/or the autonomous driving module(s) 160 can control the direction and/or speed of the vehicle 100. The processor(s) 110, the lane occupancy system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the lane occupancy system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the occupancy module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A lane occupancy system for determining whether lanes in a surrounding environment of an ego vehicle are occupied, comprising:
   one or more processors;
   a memory communicably coupled to the one or more processors and storing: an acquisition module including instructions that when executed by the one or more processors cause the one or more processors to, in response to detecting a surrounding vehicle from sensor data acquired about the surrounding environment by the ego vehicle, update a vehicle track for the surrounding vehicle in relation to the ego vehicle; and
   an occupancy module including instructions that when executed by the one or more processors cause the one or more processors to compute a position probability indicating a probable lateral position of the surrounding vehicle in relation to the ego vehicle as a function of the vehicle track, wherein the occupancy module includes instructions to compute the position probability including instructions to determine a discrete probability that represents a relative lateral offset for the surrounding vehicle over prior lateral offsets identified in the vehicle track in comparison to the ego vehicle and according to partitions of the lanes identified by the ego vehicle, and
   wherein the occupancy module further includes instructions to generate an occupancy indicator specifying which of the lanes the surrounding vehicle is occupying according to the position probability satisfying an occupancy threshold for a respective one of the lanes, wherein the occupancy module further includes instructions to compute the position probability including instructions to determine the discrete probability by applying an inverse variance weighting to combine a history of lateral offsets embodied in the vehicle into the discrete probability, and
   wherein the partitions define relative boundaries of the lanes in relation to the ego vehicle as inferred from at least the vehicle track in relation to an ego track along a route.

2. The lane occupancy system of claim 1, wherein the occupancy module includes instructions to generate the occupancy indicator including instructions to compare the position probability with the occupancy threshold to determine whether the position probability indicates within an acceptable degree of variance that the surrounding vehicle is occupying an associated one of the lanes,
   wherein the occupancy module includes instructions to generate the occupancy indicator including instructions to indicate a relative direction of the surrounding vehicle in relation to the ego vehicle when the occupancy threshold is not satisfied and indicating which of the lanes the surrounding vehicle is traveling within when the occupancy threshold is satisfied, and
   wherein the occupancy module includes instructions to generate the occupancy indicator including instructions to analyze a pattern of movement for the vehicle track when the occupancy threshold is not satisfied to characterize movements of the surrounding vehicle.

3. The lane occupancy system of claim 1, wherein the acquisition module includes instructions to detect the surrounding vehicle including instructions to determine a relative position of the surrounding vehicle in relation to the ego vehicle, the relative position being a measurement embodied by the sensor data between the ego vehicle and a lateral center position of the surrounding vehicle defining a relative two-dimensional position in relation to the ego vehicle.

4. The lane occupancy system of claim 3, wherein the acquisition module includes instructions to update the vehicle track including instructions to append the measurement to a measurement history of previous measurements of the surrounding vehicle and to adjust the previous measurements according to motion of the ego vehicle since a previous update, and wherein the vehicle track is a parameterization of the measurement history that defines an estimated path of the surrounding vehicle.

5. The lane occupancy system of claim 1, wherein the acquisition module includes instructions to detect the surrounding vehicle including instructions to detect multiple surrounding vehicles and to compute separate position probabilities for the multiple surrounding vehicles including generating separate occupancy indicators for the multiple surrounding vehicles.

6. The lane occupancy system of claim 1, wherein the acquisition module includes instructions to acquire the sensor data including instructions to fuse acquired data from multiple separate sensors together into the sensor data to form measurements of relative positions between the ego vehicle and the surrounding vehicle, and wherein the relative position in relation to the ego vehicle is determined from a center point of a lane corresponding to the ego vehicle.

7. The lane occupancy system of claim 1, wherein the acquisition module includes instructions to detect the surrounding vehicle including instructions to differentiate the surrounding vehicle from the surrounding environment by applying an object recognition algorithm over the sensor data and to determine a measurement to a lateral geometric center of the surrounding vehicle from the ego vehicle, and wherein the acquisition module includes instructions to update including instructions to populate a data structure with the measurement to further define the vehicle track when the surrounding vehicle was previously detected, and to initially generate the data structure to store the measurement when the surrounding vehicle has not been previously detected.

8. A non-transitory computer-readable medium for determining whether lanes in a surrounding environment of an ego vehicle are occupied and including instructions that when executed by one or more processors cause the one or more processors to:
  in response to detecting a surrounding vehicle from sensor data acquired about the surrounding environment by the ego vehicle, update a vehicle track for the surrounding vehicle in relation to the ego vehicle;
  compute a position probability indicating a probable lateral position of the surrounding vehicle in relation to the ego vehicle as a function of the vehicle track, wherein the instructions to compute the position probability include instructions to determine a discrete probability that represents a relative lateral offset for the surrounding vehicle over prior lateral offsets identified in the vehicle track in comparison to the ego vehicle and according to partitions of the lanes identified by the ego vehicle; and
  generate an occupancy indicator specifying which of the lanes the surrounding vehicle is occupying according to the position probability satisfying an occupancy threshold for a respective one of the lanes,
  wherein the occupancy indicator further includes calculating the discrete probability by applying an inverse variance weighting to combine a history of lateral offsets embodied in the vehicle into the discrete probability, and
  wherein the partitions define relative boundaries of the lanes in relation to the ego vehicle as inferred from at least the vehicle track in relation to an ego track along a route.

9. The non-transitory computer-readable medium of claim 8, wherein the instructions to generate the occupancy indicator include instructions to compare the position probability with the occupancy threshold to determine whether the position probability indicates an acceptable degree of variance that the surrounding vehicle is occupying an associated one of the lanes,
  wherein the instructions to generate the occupancy indicator include instructions to indicate a relative direction of the surrounding vehicle in relation to the ego vehicle when the occupancy threshold is not satisfied and indicating which of the lanes the surrounding vehicle is traveling within when the occupancy threshold is satisfied, and
  wherein the instructions to generate the occupancy indicator include instructions to analyze a pattern of movement for the vehicle track when the occupancy threshold is not satisfied to characterize movements of the surrounding vehicle.

10. The non-transitory computer-readable medium of claim 8, wherein the instructions to detect the surrounding vehicle include instructions to determine a relative position of the surrounding vehicle in relation to the ego vehicle, the relative position being a measurement embodied by the sensor data between the ego vehicle and a lateral center position of the surrounding vehicle defining a relative two-dimensional position in relation to the ego vehicle.

11. The non-transitory computer-readable medium of claim 10, wherein the instructions to update the vehicle track include instructions to append the measurement to a measurement history of previous measurements of the surrounding vehicle and to adjust the previous measurements according to motion of the ego vehicle since a previous update, and wherein the vehicle track is a parameterization of the measurement history that defines an estimated path of the surrounding vehicle.

12. A method of determining whether lanes in a surrounding environment of an ego vehicle are occupied, comprising:
  in response to detecting a surrounding vehicle from sensor data acquired about the surrounding environment by the ego vehicle, updating a vehicle track for the surrounding vehicle in relation to the ego vehicle;
  computing a position probability indicating a probable lateral position of the surrounding vehicle in relation to the ego vehicle as a function of the vehicle track, wherein computing the position probability includes determining a discrete probability that represents a relative lateral offset for the surrounding vehicle over prior lateral offsets identified in the vehicle track in comparison to the ego vehicle and according to partitions of the lanes identified by the ego vehicle,
  wherein computing the position probability further includes determining the discrete probability by applying an inverse variance weighting to combine a history of lateral offsets embodied in the vehicle into the discrete probability determining a discrete probability that represents a mean lateral offset for the surrounding vehicle over the vehicle track and according to partitions of the lanes identified by the ego vehicle, and
  wherein the partitions define relative boundaries of the lanes in relation to the ego vehicle as inferred from at least the vehicle track in relation to an ego track along a route; and
  generating an occupancy indicator specifying which of the lanes the surrounding vehicle is occupying according to the position probability satisfying an occupancy threshold for a respective one of the lanes.

13. The method of claim 12, wherein generating the occupancy indicator includes comparing the position probability with the occupancy threshold to determine whether the position probability indicates within an acceptable degree of variance that the surrounding vehicle is occupying an associated one of the lanes,
  wherein generating the occupancy indicator includes indicating a relative direction of the surrounding vehicle in relation to the ego vehicle when the occupancy threshold is not satisfied and indicating which of the lanes the surrounding vehicle is traveling within when the occupancy threshold is satisfied, and
  wherein generating the occupancy indicator includes analyzing a pattern of movement for the vehicle track when the occupancy threshold is not satisfied to characterize movements of the surrounding vehicle.

14. The method of claim 12, wherein detecting the surrounding vehicle includes determining a relative position of the surrounding vehicle in relation to the ego vehicle, the relative position being a measurement embodied by the sensor data between the ego vehicle and a lateral center position of the surrounding vehicle defining a relative two-dimensional position in relation to the ego vehicle.

15. The method of claim 14, wherein updating the vehicle track includes appending the measurement to a measurement history of previous measurements of the surrounding vehicle and adjusting the previous measurements according to motion of the ego vehicle since a previous update, and wherein the vehicle track is a parameterization of the measurement history that defines an estimated path of the surrounding vehicle.

16. The method of claim 12, wherein detecting the surrounding vehicle includes detecting multiple surrounding vehicles and computing separate position probabilities for the multiple surrounding vehicles including generating separate occupancy indicators for the multiple surrounding vehicles.

17. The method of claim 12, wherein acquiring the sensor data includes fusing acquired data from multiple separate sensors together into the sensor data to form measurements of relative positions between the ego vehicle and the surrounding vehicle, wherein the relative position in relation to the ego vehicle is determined from a center point of a lane corresponding to the ego vehicle, wherein detecting the surrounding vehicle includes differentiating the surrounding vehicle from the surrounding environment by applying an object recognition algorithm over the sensor data and determining a measurement to a lateral geometric center of the surrounding vehicle, wherein updating includes populating a data structure with the measurement to further define the vehicle track when the surrounding vehicle was previously detected, and wherein updating includes initially generating the data structure to store the measurement when the surrounding vehicle has not been previously detected.

* * * * *

UNITED STATES PATENT AND TRADEMARK OFFICE
CERTIFICATE OF CORRECTION

PATENT NO. : 10,553,117 B1
APPLICATION NO. : 16/181913
DATED : February 4, 2020
INVENTOR(S) : Miles J. Johnson and Christopher J Smalley Page 1 of 1

It is certified that error appears in the above-identified patent and that said Letters Patent is hereby corrected as shown below:

In the Claims

Column 22, Line 10:
Add "track" between vehicle and into

Column 23, Line 41:
Add "track" between vehicle and into

Column 24, Line 34:
Add "track" between vehicle and into

Column 24, Lines 35-38:
Delete "…determining a discrete probability that represents a mean lateral offset for the surrounding vehicle over the vehicle track and according to partitions of the lanes identified by the ego vehicle"

Signed and Sealed this
Twenty-third Day of June, 2020

Andrei Iancu
*Director of the United States Patent and Trademark Office*